United States Patent
Hessel

(10) Patent No.: US 9,300,410 B1
(45) Date of Patent: Mar. 29, 2016

(54) RECEIVER CALIBRATION

(71) Applicant: Steven Ray Hessel, San Jose, CA (US)

(72) Inventor: Steven Ray Hessel, San Jose, CA (US)

( * ) Notice: Subject to any disclaimer, the term of this patent is extended or adjusted under 35 U.S.C. 154(b) by 60 days.

(21) Appl. No.: 14/144,910

(22) Filed: Dec. 31, 2013

Related U.S. Application Data

(62) Division of application No. 12/156,376, filed on Jun. 30, 2008, now Pat. No. 8,620,301.

(60) Provisional application No. 60/932,442, filed on Jun. 30, 2007.

(51) Int. Cl.
*H04W 24/04* (2009.01)
*H04B 17/00* (2015.01)

(52) U.S. Cl.
CPC .................. *H04B 17/0062* (2013.01)

(58) Field of Classification Search
CPC .................................. H04W 72/085
USPC ............ 455/423, 67.11, 67.16; 370/252, 253
See application file for complete search history.

(56) References Cited

U.S. PATENT DOCUMENTS

| | | | |
|---|---|---|---|
| 7,187,646 B2* | 3/2007 | Schramm .................... 370/206 |
| 7,599,670 B2* | 10/2009 | Turner ....................... 455/127.1 |
| 7,610,019 B2* | 10/2009 | Moon et al. ................ 455/67.11 |
| 8,498,580 B2* | 7/2013 | Mourad ...................... 455/67.11 |
| 8,620,301 B1* | 12/2013 | Hessel ......................... 455/423 |
| 8,681,647 B2* | 3/2014 | Le Goue et al. ........... 370/252 |
| 2002/0142728 A1* | 10/2002 | Paul et al. .................. 455/67.1 |

* cited by examiner

*Primary Examiner* — Sonny Trinh

(57) ABSTRACT

A process and apparatus (called Receiver Calibration) are described, that allows the determination of responses of a receiver to signals, the property values of which are known. The signals with known property values are supplied to the receiver via guided waves, i.e. in a controlled environment. The Receiver Calibration is suitable for calibration of a wide variety of devices.

20 Claims, 4 Drawing Sheets

RECEIVER CALIBRATION

CROSS-REFERENCE TO RELATED APPLICATIONS

Figure 1:
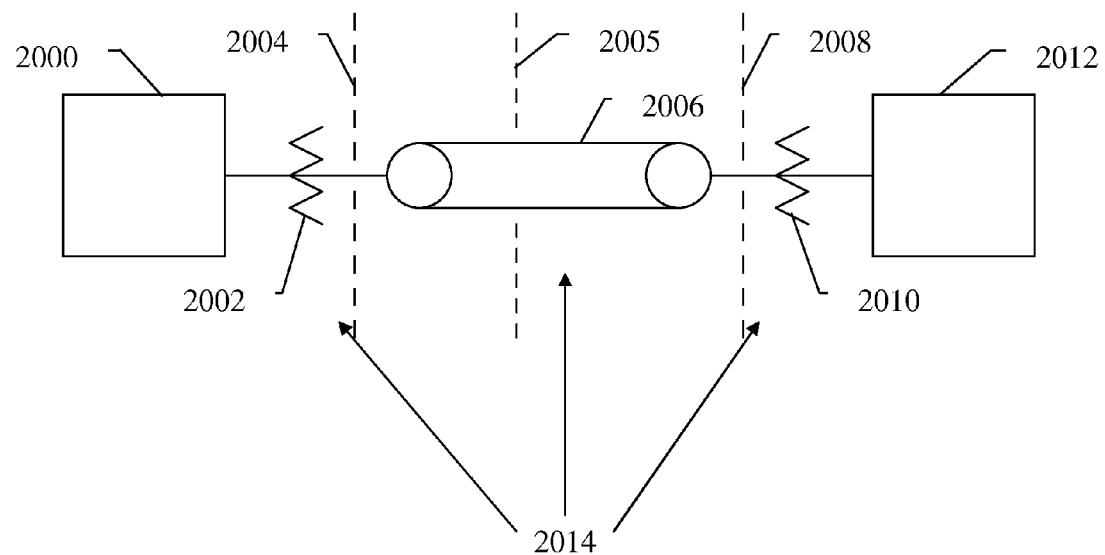

This application claims the benefit of PPA Ser. No. 60/932,442, filed 2007 May 30 and of U.S. Pat. No. 8,620,301 (application Ser. No. 12/156,376), filed 2008 May 30 both by the present inventor, and both incorporated by reference.

This patent application and another patent application Ser. No. 14/144,797, "Weak Signal Generation," were both divided from U.S. Pat. No. 8,620,301. That other patent application Ser. No. 14/144,797 "Weak Signal Generation" is incorporated by reference.

FEDERALLY SPONSORED RESEARCH

Not Applicable

SEQUENCE LISTING OR PROGRAM

Not Applicable

BACKGROUND OF THE INVENTION

1. Field of Invention

This invention generally relates to electronic measurement, specifically to calibration of radio frequency equipment such as can be used to perform measurements of radiated waves and other tasks.

2. Prior Art

Receiver Calibration

Previously, receivers were calibrated using signal generators that used switchable attenuators (functionally similar to concatenations of attenuators and having errors similar to concatenations of attenuators as described in BACKGROUND OF THE INVENTION—PRIOR ART, Weak Signal Generation in the other patent application Ser. No. 14/144,797 divided from U.S. Pat. No. 8,620,301, "Weak Signal Generation".) Some signal generators have the ability to synthesize certain complex signals such as are used by modern communication receivers, though these signal generators are usually quite expensive. Such signal generators are often adequately shielded that the output signal can be attenuated to quite a weak strength without the output signal being overwhelmed by direct radiation from the signal generator to the receiver.

Sometimes the ability to synthesize a particular modulation in a signal generator is not practical at an acceptable price. In such a case it is more practical to use a transmitter designed to communicate using the desired protocols (including complex signals) as the signal source for receiver calibration. The signal is attenuated before being delivered to the receiver under test. Since a transmitter is designed to send signals at relatively high power levels, it is usually not shielded sufficiently for receiver test. Additional shielding must usually be supplied. Previously, that has often been done by housing one of the communicating units, usually the receiver, in a shielded room. Shielded rooms are expensive; hence, often not readily available.

Often, receivers that are designed for communication are designed for that and little more. They do not have the ability to measure signal properties, or can do so only with poor accuracy. This last fact leads to the site survey methods described in BACKGROUND OF THE INVENTION—PRIOR ART in U.S. Pat. No. 8,620,301.

SUMMARY

To partially facilitate that first process and apparatus described in U.S. Pat. No. 8,620,301, a second process and apparatus (called "Receiver Calibration") are described, that allows the determination of responses of the receiver in the first process and apparatus to signals, the properties of which are known. The signals with known properties are supplied to the receiver via guided waves, i.e. in a controlled environment. Once calibrated, the receiver (or other equipment) can be used to measure unknown signals, including those from unguided waves. The Receiver Calibration is suitable for input calibration applications beyond the calibration of the first process and apparatus.

DRAWINGS

Figures

FIG. 1. Diagram of first embodiment of measurement apparatus for calibration of a receiver. Note that all components on the path between the signal source 2000 and the 2012 are optional and the physical relationship of the attenuating devices and cable to the shields are shown only approximately.

Figure 2:
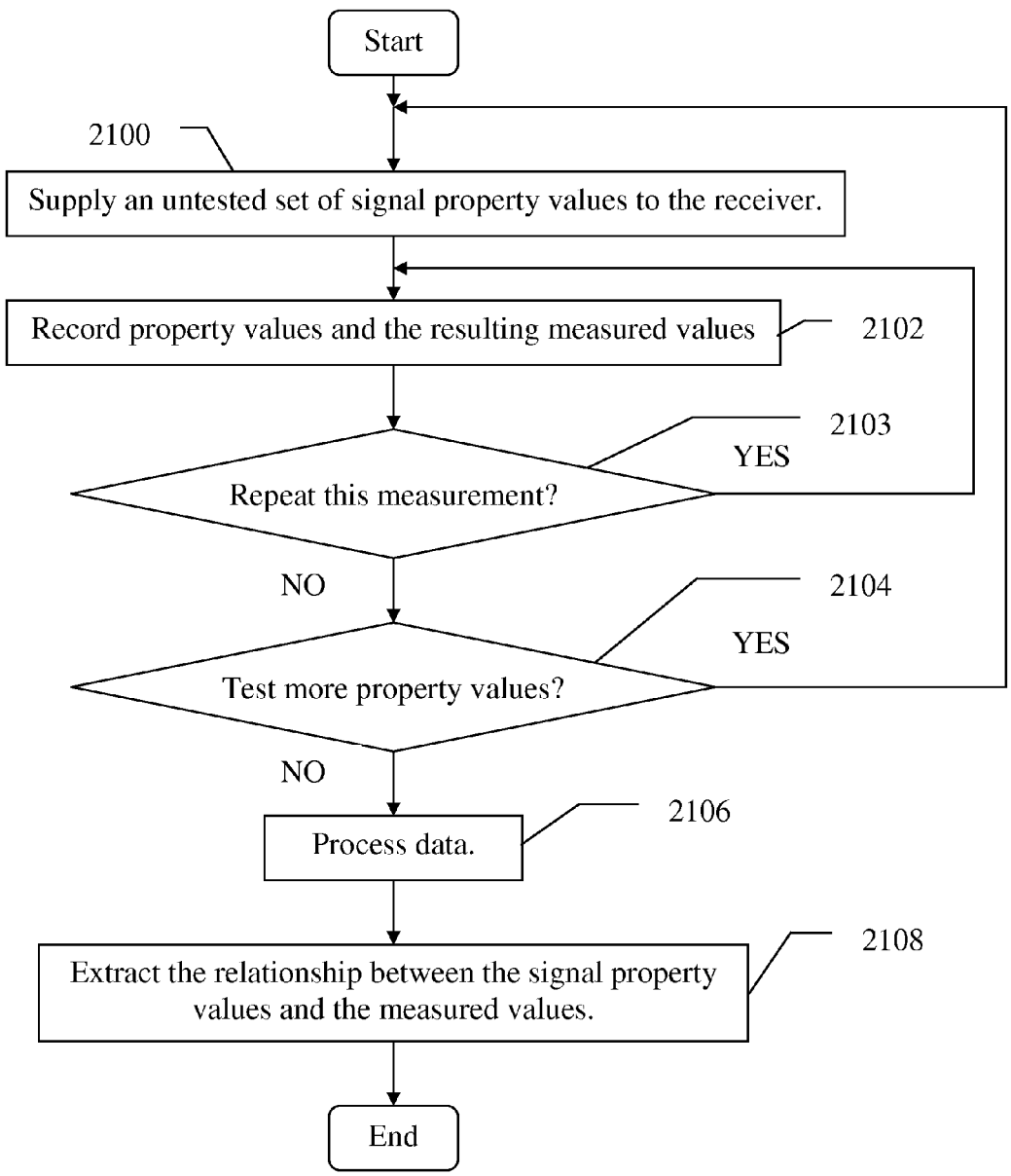

FIG. 2. Receiver calibration procedure

Figure 3:
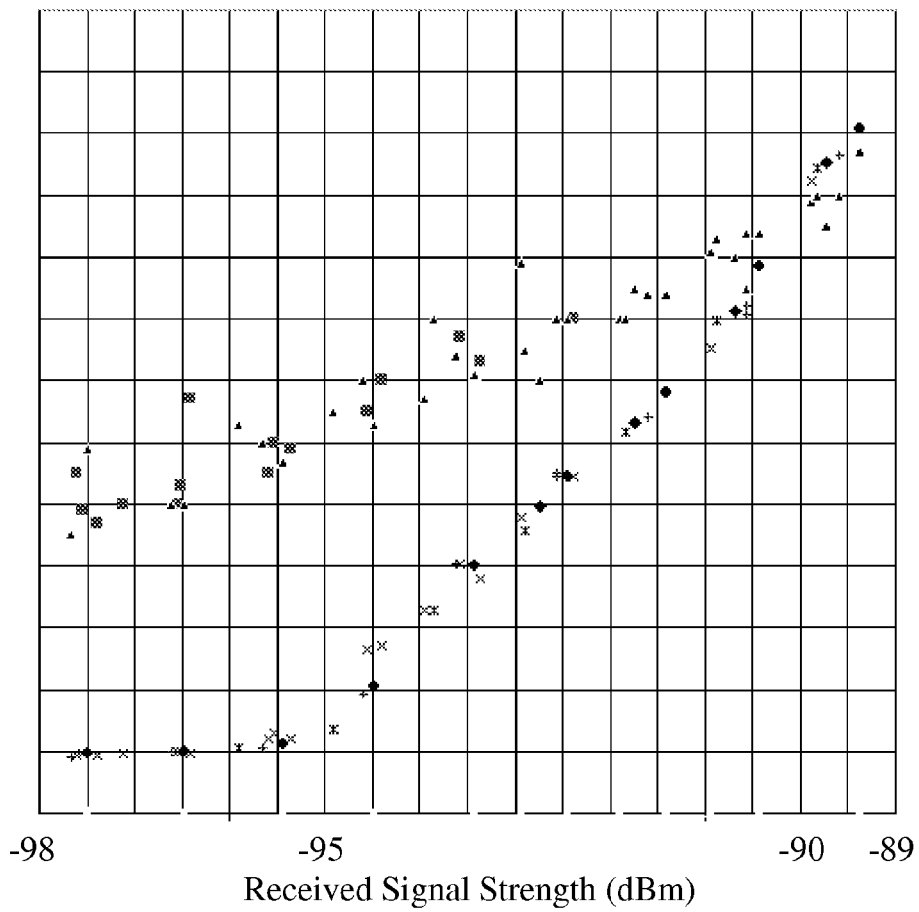

FIG. 3. Example of data recorded by the RECEIVER CALIBRATION procedure and apparatus. The x-axis shows the strength of the signal reaching the receiver in dBm. The upper band of points consisting of squares and triangles is RSSI divided by noise. The lower band of points shows saturated throughput.

Figure 4:

FIG. 4. Unguided Wave Measurement

DRAWINGS

Reference Numerals

2000 Signal source (could be a transmitter.)
2002 Attenuating devices. Zero or more may be present. They may be placed on either side of the shield, passing through it or more than one of the foregoing locations.
2004 Optional shield which may be a shielded room. The shield may be made of reflective or absorptive material or both.
2005 Optional shield which may be a shielded room. The shield may be made of reflective or absorptive material or both.
2006 Optional cable allowing physical separation of equipment.
2008 Optional shield which may be a shielded room. The shield may be made of reflective or absorptive material or both.
2010 Attenuating devices. Zero or more may be present. They may be placed on either side of the shield, passing through it or more than one of the foregoing locations.
2012 Measuring receiver
2014 Measured link
2100 Select the values of output signal strength, attenuating devices, and other signal properties so as to provide an as-yet, untested set of signal property values to the measuring receiver 2012.
2102 Record signal property values and the resulting measured values.
2103 Repeat this measurement?
2104 Are more signal property values to be tested?
2106 Process data.

2108 Extract a relationship between the signal property values and measured values 2202 Measured link transmitter antenna. This antenna may also be used by the backchannel if the transceiver shares one antenna between the measured link and the backchannel.

2204 Measured link receiver antenna. This antenna may also be used by the backchannel if the receiver shares one antenna between the measured link and the backchannel.

GLOSSARY

An attenuating device is a component or combination of components that provides a relationship between an input signal and an output signal wherein the output signal is weaker than the input signal. The components of the attenuation device could be resistors, attenuating devices, cables or any other combination that provides a net signal loss; thus, an attenuating device as described here can be a concatenation of elements that themselves fit this definition of an attenuating device. In this paper, each setting of a step attenuator or variable attenuator will be treated as a separate attenuating device. It is worth noting that most attenuating devices have only two ports.

A bifurcation function is a function that bifurcates or splits a signal arriving on one path onto two paths. The signal on the two paths may differ in phase and amplitude. Common examples of components that implement bifurcation functions are splitters and couplers. Note that bifurcation functions typically also allow signal to pass in both directions; that is, if a signal arriving at port 1 of a bifurcation function is split between ports 2 and 3, then a signal arriving at port 2 will be passed to port 1 and possibly to port 3 also. This bidirectional capability is required of the bifurcation functions used here.

Channel rate is the rate at which the channel can send data assuming it could do so continuously. It is a characteristic of the channel or link. It is closely related to the clock rate used for data bits.

A concatenation of two attenuating devices is an attenuating device created by connecting one port on one attenuating device to one port on a different attenuating device. The resulting attenuating device can be concatenated with an additional attenuating device, ad infinitum. For linguistic convenience, a concatenation of one attenuating device is defined as that single attenuating device.

Indirect measurement occurs when one or more direct measurements are used to find or approximate a function or value of a property different than the property or properties measured directly (e.g. a measurement of signal to noise ratio may in some cases be used to approximate packet failure rate.)

Mismatch describes the tendency of radio frequency power to be transferred incompletely from a power supplying device to a power consuming device when the impedance seen looking into the port of the power supplying device differs from the complex conjugate of the impedance seen looking into the port of the power consuming device. For example, aA power supplying device that can be modeled as a signal generator capable of supplying 1 watt of power into a 100 Ohm load and can be modeled as having an impedance of 50 Ohms to its port, will, when connected to a power consuming device with 50 Ohms impedance seen at its port, transfer 0.5 Watts to the power consuming device. If either impedance deviates from the complex conjugate of the other, less power will be transferred. Similarly, if one port presents an impedance of 50+j 50 Ohms, and the other port, an impedance of 50−j 50 Ohms, 0.5 Watts will be transferred, and any deviation from the matched impedance will result in mismatch and less power being transferred. Mismatch can be described by many different parameters, all of which allow the efficiency of power transfer to be calculated.

Source and meter calibration is a procedure for calibrating the components used in the generation of weak signals as described in OPERATION—FIRST EMBODIMENT—FIGS. 1 & 2, WEAK SIGNAL GENERATION and the associated figures in the other patent application Ser. No. 14/144,797 divided from U.S. Pat. No. 8,620,301, "Weak Signal Generation".

A transfer property is any member of a set of properties such that the value of the transfer property, in concert with some other members of the set (and possibly other information such as the interval of time over which a measurement is made), can be used to derive many of the other members of the set much as is described in Measurement of the Signal Strength Received in Site Survey Procedure in OPERATION—COMMUNICATION MEASUREMENT—FIGS. 2-16. Transfer properties include, but are not limited to:

packet success count;
packet failure count;
packet attempt count;
packet success rate;
packet failure rate;
packet attempt rate;
packet success probability;
packet failure probability;
bit success count;
bit failure count;
bit attempt count;
bit success rate;
bit failure rate;
bit attempt rate;
bit success probability;
bit failure probability;
throughput (may be TCP, UDP, or any other protocol) and any functionally equivalent metric.

DETAILED DESCRIPTION

First Embodiment—FIG. 1 Receiver Calibration

FIG. 1 shows a signal source 2000 electrically connected to zero or more attenuating devices 2002. The attenuating devices 2002 are electrically connected to an optional cable 2006. The cable 2006 is electrically connected to zero or more attenuating devices 2010. The attenuating devices 2010 are electrically connected to a measuring receiver 2012 that conforms to the broad definition on of "measuring receiver" found in the Glossary in U.S. Pat. No. 8,620,301. The attenuating devices 2002 are placed so that they are on either side, both sides of and/or passing through an optional shield 2004. Similarly, cable 2006 and attenuating devices 2010 are placed so that they are on either side of or passing through optional shields 2005 and 2008 respectively or at multiple of the foregoing locations. The shields 2004, 2005 and 2008 can be simple shields, shielding enclosures encompassing or substantially encompassing the signal source 2000, measuring receiver 2012 or both, shielded rooms or any other structure providing electromagnetic reflection, absorption or both.

If the measuring receiver also meets the definition of a measured link receiver, then the signal source 2000 may be any signal source that also is a measured link transmitter (see also DETAILED DESCRIPTION—FIRST EMBODIMENT—FIG. 2, COMMUNICATION MEASUREMENT, Communication Measurement Instrument Criteria in U.S. Pat. No. 8,620,301.) In practice, the easiest source to use, if the protocol is complex, is often an instantiation of measured link transmitter 1000 (in U.S. Pat. No. 8,620,301) or its functional equivalent. Attenuating devices 2002, cable 2006, and attenuating devices 2010 all meet the broad definition of attenuating device given in the Glossary and collectively form what will again be called a "measured link" (2014) owing to its functional equivalence to the measured link in COMMUNICATION MEASUREMENT cited above.

OPERATION

First Embodiment—FIGS. 1-3 4 Receiver Calibration

FIG. 1 depicts equipment arranged so as to guarantee that the loss on any radiated path from the signal source to the measuring receiver is significantly greater than the loss on the guided path through attenuating devices 2002, cable 2006, and attenuating devices 2010. This is guaranteed by a combination including at least one of shielding, the distance afforded by the cable, or non-shielding materials in or near the path that is taken by radiation passing between the signal source (2000) and the measuring receiver (2012.) The Friis transmission equation describes the free-space radiation path loss due to the distance of separation of the signal source (2000) and the measuring receiver (2012) in the absence of materials in or near the path. Materials in or near the path will usually further attenuate the radiation. Thus, the amount of signal reaching the measuring receiver 2012 is dominated by the guided path. This guided wave configuration should also guarantees that the amount of externally generated interference that can reach the receiver is negligible. Using distance, outdoors or in a building, in combination with the other measures above, will often obviate the need to use an expensive shielded room to isolate a piece of equipment from signal radiated by another piece of equipment. The resulting cost and time savings can be great.

One of several procedures is shown in FIG. 2 to create a map relating properties of the measured link by using measured data. By using the signal source 2000 having known signal strength; and attenuating devices 2002, cable 2006, and attenuating devices 2010 all having known attenuations, the signal strength supplied to the measuring receiver 2012 is known to a high degree of accuracy. Many other signal properties may be of interest and can be controlled depending upon the equipment used. These properties include, but are not limited to, protocols used, protocol options and extensions, and modulation characteristics. The measuring receiver 2012 is presented with an as yet unmeasured combination of values of signal properties (FIG. 2, 2100). The responses (values measured by the measuring receiver 2012) are recorded (2102). The measured link measurements recorded may include, but are not limited to those described in DETAILED DESCRIPTION—FIRST EMBODIMENT—FIG. 2, COMMUNICATION MEASUREMENT, Communication Measurement Instrument Criteria in U.S. Pat. No. 8,620,301; indeed, any measured data that is dependent directly or indirectly upon the signal strength received can be used to measure signal strength received. Likewise, any other measured link property can potentially be used to measure those properties upon which it is dependent. The test may be repeated to allow signal averaging, to improve accuracy, or to otherwise validate or improve the measured value, estimate its consistency, etc. (2103). By selecting among a plurality of attenuating devices for use in the measured link, if possible by altering the output signal strength of signal source 2000 and selecting other values of signal properties, the test above can be repeated for a plurality of distinct values of signal properties (2104).

The accuracy of the resulting data may benefit from averaging, smoothing, and other signal processing techniques (2106). From the data collected, at least one relationship is extracted between sets of values of the signal properties supplied simultaneously to the measuring receiver 2012 (e.g. known signal amplitude, modulation, amplitude and nature of interfering signals, etc.) and responses measured (2108) by the measuring receiver. That relationship may take the form of:

a mathematical relationship;
a graph;
a table;
any map between the signal strength and the measured link property value; or
any form that allows one or more values of one property to be measured from one or more values of another property.

Any two relationships which map a property in common with one another can be used to create a relationship between the two properties which are not in common between the two relationships. (A relationship between A and B and a relationship between A and C can be used to create a relationship between B and C.)

FIG. 3 shows a graph of measured data that forms a map of the relationships between two measured link properties RSSI divided by noise and saturated throughput, and a third measured link property, received signal strength. In this case the measured link property value is received signal strength and the responses to measured link property value measured by the measured link receiver are responses of RSSI divided by noise and saturated throughput which are measured directly.

The error of the calibration method described above comes from errors in the signal source 2000, attenuating devices 2002, cable 2006, attenuating devices 2010 and the repeatability of the measuring receiver 2012. The error of each of these elements is:

fundamental to its design;
selected according to screening measurements; or
established by measurements made after manufacture (calibrating measurements), and, as is evident from Prior Art Error Analysis in this specification and in U.S. Pat. No. 8,620,301, these errors must be kept acceptably small. The third option for establishing accuracy is discussed further in WEAK SIGNAL GENERATION in the other patent application Ser. No. 14/144,797 "Weak Signal Generation."

The use of maps to measure signals can greatly enhance the measurement process. It allows the substitution of the measurement of one property for that of another. The substituted measurement may be much faster or easier to implement. The resulting data may be more accurate in some or all ranges of interest. For example, FIG. 3 shows that in the important range of −95 to −89.5 dBm saturated throughput can be used to obtain a more accurate measurement of received signal strength than RSSI divided by noise can provide. Of course this measured range can be extended through the use of attenuators.

Measurements such as the unguided wave measurements described in COMMUNICATION MEASUREMENT in U.S. Pat. No. 8,620,301 and depicted in FIG. 4, can be interpreted using the relationships described above to determine (measure) the measured link properties which caused the values (responses) measured in, for example COMMUNICATION MEASUREMENT (U.S. Pat. No. 8,620,301.)

CONCLUSION, RAMIFICATIONS, AND SCOPE

Accordingly, the reader will see that, according to one embodiment of the invention, the author has provided means of making highly accurate calibrating measurements of radio receiving equipment. The cost of the equipment required to accomplish this is not great, much less than the laboratory equipment required to achieve the same accuracy.

While the above description contains many specificities, these should not be construed as limitations on the scope of any embodiment, but as exemplifications of embodiments thereof. Many other ramifications and variations are possible within the teachings of the various embodiments. For example, the receiver calibration technique can also be used for the calibration of instruments such as spectrum analyzers. Thus, the scope of the invention should be determined by the appended claims and their legal equivalents, and not by the examples given.

I claim:

1. A method for measuring, comprising:
    measuring, in a first measurement, at least one measured link property, the at least one measured link property describing at least one first signal, the first measurement resulting in at least one first measurement response from a measuring receiver, the at least one first measurement response resulting from the at least one measured link property, the at least one measured link property having at least one first measured link property value, the at least one first measured link property value being known; the knowledge of at least one first measured link property value being known approximately or exactly, the knowledge of at least one first measured link property value being known at one or more of a location where the at least one first signal enters the measuring receiver or near the location;
    creating a map relating the at least one first measurement response and the at least one first measured link property value that resulted in the at least one first measurement response;
    placing at least one source antenna at one end of an unguided path, the at least one source antenna being connected to a signal source, the signal source providing at least one second signal, the at least one second signal having the at least one measured link property, the at least one measured link property having at least one second measured link property value;
    placing at least one receiver antenna at the other end of the unguided path, the at least one receiver antenna being connected one and only one of directly or indirectly to the measuring receiver;
    transmitting the at least one second signal from the signal source to the measuring receiver via the at least one source antenna, the unguided path, and the at the least one receiver antenna;
    measuring, in a second measurement, the at least one measured link property, the at least one measured link property describing the at least one second signal, the second measurement resulting in at least one second measurement response from the measuring receiver, the at least one second measurement response resulting from at least one measured link property, the at least one measured link property having the at least one second measured link property value; and
    using the map to estimate the at least one second measured link property value that could have resulted in the at least one second measurement response.

2. The method of claim 1 further including conveying synthetic data in one or more of the at least one first signal or the at least one second signal.

3. The method of claim 1 further including conveying real data in one or more of the at least one first signal or the at least one second signal.

4. The method of claim 1 wherein the measuring in at least one of the first measurement or the second measurement includes measuring a measured link property that is channel rate.

5. The method of claim 1 wherein the measuring in at least one of the first measurement or the second measurement includes measuring a measured link property that is a transfer property.

6. The method of claim 1 wherein the measuring in at least one of the first measurement or the second measurement includes measuring a measured link property that is a Received Signal Strength Indicator.

7. The method of claim 1 wherein the measuring in at least one of the first measurement or the second measurement includes measuring a measured link property that is signal strength divided by noise.

8. The method of claim 1 wherein the measuring in at least one of the first measurement or the second measurement includes measuring a measured link property that is dependent upon a transfer property.

9. The method of claim 1 further including measuring, in a first measurement, the at least one measured link property, the at least one measured link property describing at least one first signal, the first signal being transported from a signal source to the measuring receiver as a guided wave.

10. The method of claim 9 wherein the measuring in at least one of the first measurement or the second measurement includes measuring a measured link property that is dependent upon signal strength.

11. The method of claim 9 further including;
    calibrating at least one attenuating device; and
    generating one or more of the at least one first signal or the at least one second signal, by means of passing the one or more of the at least one first signal or the at least one second signal through the at least one calibrated attenuating device.

12. The method of claim 11 wherein calibrating includes calibrating mismatch of at least one port of the at least one attenuating device.

13. The method of claim 11 wherein calibrating includes calibrating attenuation of the at least one attenuating device.

14. The method of claim 13 wherein calibrating the attenuation is accomplished by source and meter calibration.

15. The method of claim 11 wherein measuring in the first measurement and the creating the map includes:
    measuring, in the first measurement, the at least one measured link property that describes two or more first signals, the first measurement resulting in two or more first measurement responses from the measuring receiver, the two or more first measurement responses resulting from the at least one measured link property, each first signal having a set of the first measured link property values, each of the sets containing the at least one first measured link property value and the first measured link property values contained in at least one of the sets differing from at least one of the other sets; and creating a map relating at least two of the two or more of the differing sets, to the at least one first measurement response, the at least one first measurement response resulting from each of the at least two of the two or more of the differing sets.

16. A measurement apparatus comprising:
at least one first signal, the first signal being described by at least one measured link property;
a guided path guiding the at least one first signal to a measuring receiver;
the measuring receiver, receiving the at least one first signal from the guided path, the measuring receiver, measuring the at least one measured link property in a first measurement, the first measurement resulting in at least one first measurement response from the measuring receiver, the at least one first measurement response resulting from the at least one measured link property, the at least one measured link property having at least one first measured link property value, the at least one first measured link property value being known; the knowledge of at least one first measured link property value being known approximately or exactly, the knowledge of at least one first measured link property value being known at one or more of a location where the at least one first signal enters the measuring receiver or near the location;
a map relating the at least one first measurement response to the at least one first measured link property value that generated the at least one first measurement response;
a second path to the measuring receiver including:
  at least one source antenna radiating at least one second signal,
  at least one receiver antenna connected directly or indirectly to the measuring receiver, and
  an unguided path between the at least one source antenna and the at least one receiver antenna;
the measuring receiver, receiving the at least one second signal from the second path and measuring, in a second measurement, the at least one measured link property, the second signal being described by the at least one measured link property, the second measurement resulting in at least one second measurement response from the measuring receiver, the at least one second measurement response resulting from the at least one measured link property, the at least one measured link property having at least one second measured link property value; and
the map being used to estimate the at least one second measured link property value that could have resulted in the at least one second measurement response.

17. The apparatus of claim 16 wherein the measuring receiver in at least one of the first measurement or the second measurement includes measuring a measured link property that is dependent upon signal strength.

18. The apparatus of claim 17 further including
at least one attenuating device having an attenuation, the attenuation being calibrated by source and meter calibration; and
the apparatus of claim 17 wherein
one or more the at least one first signal or the at least one second signal being produced by the use of the at least one calibrated attenuating device.

19. The apparatus of claim 16 wherein the measuring receiver in at least one of the first measurement or the second measurement includes measuring a measured link property that is a transfer property.

20. The apparatus of claim 16 wherein the measuring receiver in at least one of the first measurement or the second measurement includes measuring a measured link property that is dependent upon a transfer property.

* * * * *